United States Patent [19]

Gustafson et al.

[11] 4,065,538
[45] Dec. 27, 1977

[54] PROCESS FOR REDUCING DUST IN FIBRILLATED YARN

[75] Inventors: Kenneth C. Gustafson, Chattanooga, Tenn.; Edward L. Chastain, Lafayette, Ga.

[73] Assignee: Fibron, Inc., Chattanooga, Tenn.

[21] Appl. No.: 616,939

[22] Filed: Sept. 26, 1975

[51] Int. Cl.² .................... B29C 17/12; B29C 17/00
[52] U.S. Cl. ............................... 264/154; 28/218; 264/345; 264/DIG. 47
[58] Field of Search ............... 264/DIG. 47, 154, 234, 264/345, 146, DIG. 8; 28/DIG. 1; 57/157 F, 157 TS

[56] References Cited

U.S. PATENT DOCUMENTS

| 3,058,291 | 10/1962 | Heberlein et al. | 57/157 TS |
| 3,702,055 | 11/1972 | Kosaka et al. | 57/157 F |
| 3,874,160 | 4/1975 | Kitazawa et al. | 57/157 TS |

FOREIGN PATENT DOCUMENTS

| 47-8780 | 3/1972 | Japan | 28/DIG. 1 |

Primary Examiner—James B. Lowe
Attorney, Agent, or Firm—Harrington A. Lackey

[57] ABSTRACT

The process of reducing dust particles formed in the fibrillation of tape yarns of synthetic material by applying a sufficient amount of heat to the fibrillated tape yarn to cause said synthetic dust particles to fuse into said tape yarn.

10 Claims, 4 Drawing Figures

PROCESS FOR REDUCING DUST IN FIBRILLATED YARN

BACKGROUND OF THE INVENTION

This invention relates to a process for reducing dust in fibrillated yarns, and more particularly, to a process for applying heat to said fibrillated yarns in order to reduce the dust particles.

In the formation of tape yarns of synthetic material by the fibrillation of film or tape, slitting or splitting the tape produces dust particles of the synthetic material in the form of fibrils and debris. The fibrils are thin fibers or threads having one of their ends attached to the tape yarn, either on the edges of the yarn or in the margins of the slit openings. The debris is broken or detached pieces or threads of the synthetic tape material remaining adhered to the surface of the tape yarn by static attraction, or in the form of loose dust particles detached from the tape yarn and settling on surrounding surfaces, such as parts of the fibrillating machine.

The fibrils and the debris statically attracted to the surface of the tape yarn, may remain on the tape yarn throughout subsequent yarn processing, or they may be separated by being broken off, knocked off or scraped off, during subsequent yarn processing steps, such as by reversal of movement of the tape yarn over yarn guides, or during winding or rewinding of the tape yarns about spindles or bobbins.

Furthermore, after the yarn, to which the dust particles adhere, are shipped to destinations in which the yarn is processed into fabrics, such as by weaving or knitting, such dust particles may be removed by the weaving apparatus or by the knitting apparatus, such as in the latches of the knitting needles. The resulting accumulation of dust particles upon the fabric processing machinery, such as the latches of the knitting needles, can jam or otherwise render inopertive such fabric processing parts, causing break-downs in the machinery, less efficient operation of the machinery, and/or fabrics of poor or unacceptable quality.

Several methods of reducing the occurrence of dust particles or removing the dust particles have been tried by the fibrillated yarn industry. One method is the blowing of air upon the yarns in order to remove the fibrils and debris. Another method is to mechanically brush the yarns after fibrillation to remove the dust particles. Another method, that has been tried, is to treat the fibrillated yarns with solvents in order to remove the dust particles. Yet another method is to treat the fibrillated yarns with water in order to wash the fibrils and debris from the yarns. Another method is electrostatic in nature to remove the dust particles from the yarns.

All of the above methods have met with limited or little success, and even those processes which are partially successful have other drawbacks, such as economics.

The applicants themselves first attempted to solve the problem of dust particle removal from fibrillated yarns by a method, which seemed obvious to them, of applying air-jet streams upon the in-line movement of the fibrillated tape yarns after fibrillation. Numerous experiments were conducted, including varying the spacing, number of air streams, angle of attack of air streams upon the moving in-line fibrillated tape yarns. However, such experiments removed only approximately 20 – 50 percent of the dust particles, a result which was unacceptable to customers, particularly in the knitting industry. Microscopic analyses of the air-treated fibrillated tape yarns revealed that dust particles in the form of attached fibrils tended to remain upon the tape yarns because the air jets were not sufficiently effective to remove such fibrils or to break them loose from the tape yarns. Increasing the pressure of the air improved the results of the dust particle removal from the fibrillated tape yarns, but such increased air pressure also created the problem of deflecting the tape yarns laterally in varying degrees away from their longitudinal in-line feeding direction. Such deflection could cause undue slack in the yarn, or tangling.

Another problem with a method of dust removal incorporating air streams of even the most efficient types, is that all such processes require a dust collection system in addition to the air projection system. Otherwise, the dust removed from the yarns would accumulate in other areas and other surfaces in the plant, creating additional problems of removing the dust from such other areas and surfaces.

It was also found that dust removal efficiency was increased by increasing the "yarn residence time" within the air jet stream. However the increased "yarn residence time" also subjected a greater length of the tape yarn to lateral deflection.

Although lateral deflection could be minimized by passing the yarn over a solid backing plate of some type, nevertheless the backing plate produces wear and abrasion upon the tape yarns as they move over the backing plate and are blown against the backing plate by the air jets.

SUMMARY OF INVENTION

It is therefore an object of this invention to provide a method of substantially reducing dust particles in fibrillated yarn by the application of heat to the fibrillated tape yarns.

In the application of heat to the fibrillated tape yarns in order to remove the dust particles, including fibrils and debris, the heat must be applied to the tape yarns at the time of fibrillation, or at any stage of processing thereafter, and in a sufficient amount to cause both the fibrils and the debris to melt and break off, or melt, contract, and fuse back into the fibrillated tape yarn itself, without melting or in any way destroying or damaging the integrity of the synthetic material in the tape yarn itself.

The amount of heat applied to the fibrillated tape yarn of course depends on several variable factors, including temperature of the heat source, the spacing of the heat source from the tape yarn, and therefore the temperature of the heat applied directly to the tape yarn; the mass of the tape yarn, and specifically the thickness of the tape yarn; the specific heat of the synthetic material from which the tape yarn is made; the linear speed of the tape; the residence time of the tape yarn exposed to the heat source, or the length of the section of tape yarn exposed to the heat source at any one time.

By controlling the above factors to obtain the optimum parameters, the efficiency of removing the dust particles has been increased to at least 80%.

DESCRIPTION OF THE PREFERRED EMBODIMENTS

Figure 1:
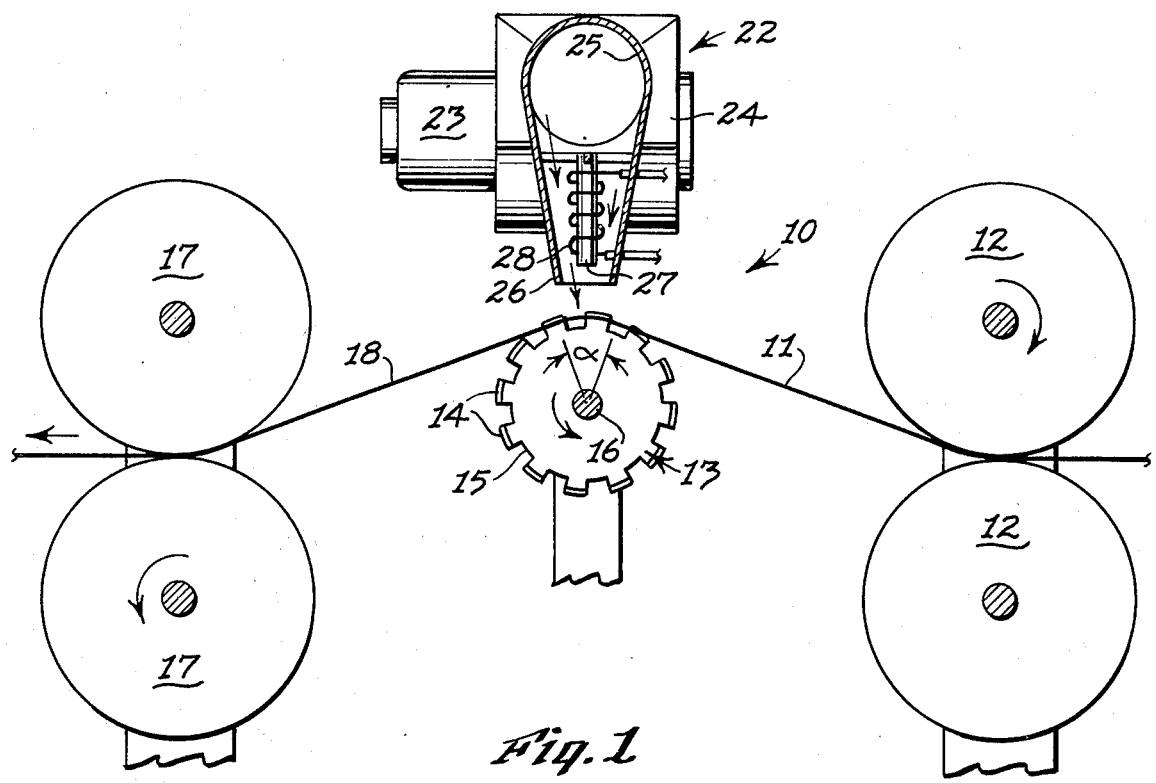
FIG. 1 is a side elevation of one form of apparatus for carrying out the process in accordance with this invention, with a blower nozzle disclosed in section.
Figure 2:
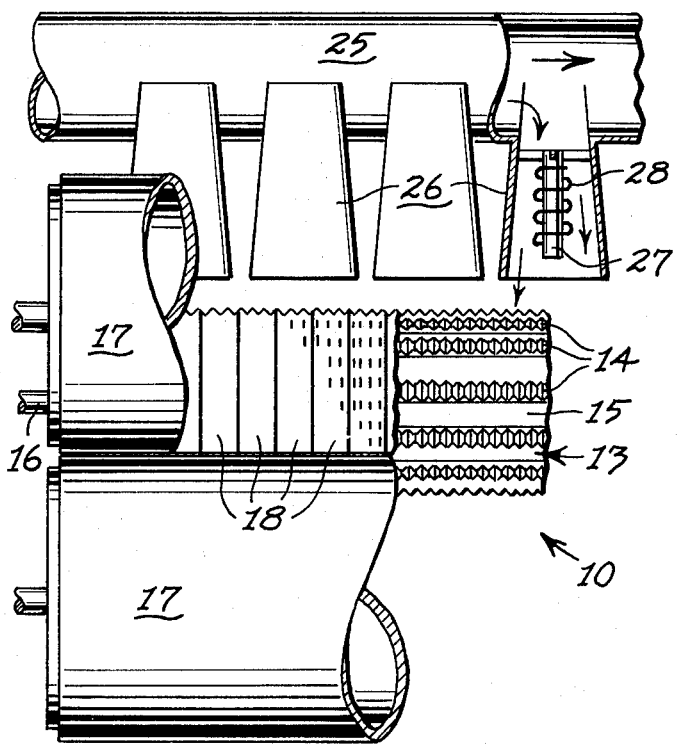
FIG. 2 is a fragmentary front elevation of the apparatus disclosed in FIG. 1, with parts broken away.

Referring now to the drawings in more detail, FIGS. 1 and 2 disclose a typical apparatus 10 for carrying out the process in accordance with this invention.

In one form of fibrillation of tapes 11 of synthetic material, such as polypropylene, a film is formed upstream of the feed rollers 12 by extrusion and cooling, and is subsequently cut into tapes 11. The tapes 11 are then pulled across the rotary fibrillator head 13 by the draw rollers 17. The fibrillator head 13 is preferably of a type such as that disclosed in the U.S. Nozawa Pat. No. 3,427,912, issued Feb. 18, 1969, including a plurality of axial cutter sections or bars 14 equally spaced and separated from each other by axially directed lands or recesses 15 around the periphery of the generally cylindrical fibrillator head 13. The fibrillator head 13 is mounted upon a co-axial shaft 16 which is driven in the direction of the arrow by any convenient drive means, not shown, and at any predetermined speed.

Figure 3:
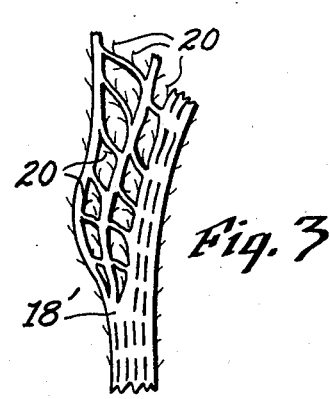
FIG. 3 is a greatly enlarged fragmentary plan view of a section of fibrillated tape yarn, with its network structure partially expanded to show the attached fibrils before the application of heat in accordance with this invention.

The tapes 11 are pulled across the rotating fibrillator head 13 by draw rollers 17, usually at a speed less than the speed of the rotary fibrillator head 13. In this manner, the faster moving cutter bars 14 will split, rip or shock by impact, longitudinal slits in the tape 11 to form the fibrillated tape yarns 18. Ordinarily, fibrillated tape yarns 18', such as illustrated in FIG. 3, would be produced by the conventional fibrillator head 13, in the absence of any dust removal process. In the fibrillated tape yarns 18', dust particles 20 are disclosed in the form of hairy fibrils having one end physically or integrally attached to portions of the tape yarn 18', such as along the marginal edges of, as well as on the inner margins of the openings in, the network or web formation of the tape yarn 18'.

One form of heating apparatus 22 employed for carrying out this process is disclosed in FIGS. 1 and 2. The heating apparatus 22 includes a motor 23 for a blower 24 for forcing air through the manifold 25 extending transversely over the rotary fibrillator head 12. The manifold 24 is provided with a plurality of longitudinally spaced depending air nozzles 26. Each air nozzle 26 contains a heating core 27 surrounded by an electrical coil of wire 28.

Thus, as the tapes 11 move over the fibrillator head 13, hot air is discharged downward upon the top surfaces of the tape yarns 18. The tape yarns 18 are in substantially the same plane. In the preferred form of the invention, the air in the nozzles 26 is heated to a temperature which will heat the metallic or conductive surface of the fibrillator head 13 to the desired temperature range for removing the dust particles 20. A tape yarn which is approximately 1-2 mils thick is moved past a heating station wherein the critical amount of heat applied to the tape yarn of synthetic material at the heating station is substantially equivalent to the quantity of heat applied to an instantaneous linear section of the tape yarn approximately 3½ inches long moving at a linear rate of speed of approximately 660 feet per minute at a temperature of approximately 600°-700° F. When the heating station is the fibrillator, the tape yarn is moved over the fibrillator head in an arc of an optimum length of approximately 3½ inches at an optimum speed of approximately 660 feet per minute, and the critical amount of heat is applied to the fibrillator head at a temperature of approximately 600-700° F.

In a typical apparatus 10 in which 80 to 90 percent of dust particle reduction was effected, polypropylene tapes 11, approximately 1.5 mils thick, were drawn across a fibrillator head 13, 10 inches in diameter to the extremities of the cutter bars 14, at a linear speed of approximately 660 feet per minute. The rotary speed of the fibrillator head 13 was approximately 18,500 rpm. The mouths of the air nozzles 26 were spaced approximately 6 inches above the tapes 11 moving across the top of the fibrillator head 13, and the heat generated by the cores 27, as well as the speed of the movement of the air through the nozzles 26, was such as to heat the rotating fibrillator head surface to approximately 600° F., and preferably within an optimum range of 600-700° F.

The fibrillator head 13 was mounted in a position relative to the rollers 12 and 17 to create a wrap of the tapes 11 across the fibrillator head 13 having a contiguous arc, or wrap angle, of approximately 37-41°.

The tapes 11 were split narrow enough to form the final fibrillated yarns 18 of approximately 360 denier. However, the dust removal process is substantially equally efficient for any tape yarns 18 of at least 300 denier and ranging up to 30,000 denier.

Figure 4:
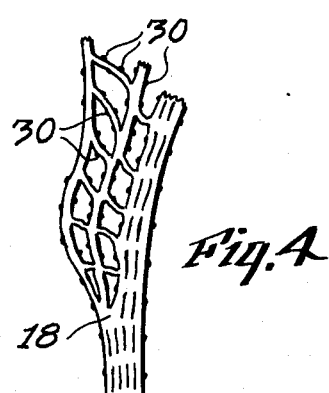
FIG. 4 is a view similar to FIG. 3 showing the same tape yarn section after the application of heat in accordance with this invention.

Microscopic analyses of the heat-treated tape yarns 18 revealed substantially dust-free tape yarns 18, each having fused nibs 30 (FIG. 4), showing that the fibrils 20 either fused back into themselves, or were sufficiently melted as to break off, leaving slightly protruding nibs 30.

Samples of both tape yarns 18 and control yarns 18' were examined under a 50X microscope. Both the frequency of the fibrils and the debris were counted separately. Twenty-four observations were conducted on four threads, that is, six observations per thread, in order to obtain data based upon the frequency per observation. Some of the test results are as follows:

TABLE I

| Tape Yarns | Fibrils | Debris | Gram Dust oz. yarn* |
|---|---|---|---|
| Test 360 Nat. | .3(R = .3–.4) | 10(R = 7–13) | .12 |
| Control | 2.1(R = .9–3.1) | 21(R = 14–24) | .22 |

R = Range
*All data combined from four different runs.

TABLE II

| Tape Yarns | Fibrils | Debris |
|---|---|---|
| 360 Brown | | |
| Test | 0.8 | 11 |
| Control | 2.5 | 14 |
| 360 Natural | | |
| Test | 0.6 | 15 |
| Control | 2.9 | 16 |

The above results show that the fibrils on the test yarn 18 are markedly fewer and shorter and generally more solidly attached to the tape yarn than the fibrils in the control yarn 18'.

Although the count of the debris is not much less in the test yarns 18 than in the control yarns 18', nevertheless, observations reveal that the debris was smaller in size and more closely adhered to the tape yarn 18.

Furthermore, the bobbins wound with the fibrillated tape yarns 18 appeared significantly cleaner and brighter than bobbins wound with the non-heat treated tape yarns 18'.

The fibrillated tape yarns 18 moving away from the fibrillator head 13 and the heating apparatus 22 appeared to be significantly more transparent than comparable fibrillated tape yarns 18' which had not been heat treated.

It will be understood that by varying the spacing of the heating apparatus 22 from the fibrillator head 13, by changing the speed of the blower 22, and/or by varying the current through the coil wires 28, the same surface temperature of 600 – 700° F. can be applied to the conductive surface of the fibrillator head 13 and achieve the same results.

Furthermore, it will be understood that by varying other factors, the temperature must be varied. For example, if the speed of the tape 11 is increased or the angle of wrap is decreased, the temperature on the surface of the fibrillator head 13 must be increased.

Under the operating conditions above described, it was noted that as the surface temperature of the fibrillator head 13 was reduced below 600° F., slightly increased amounts of dust occurred. As the temperature was further reduced, increasing amounts of dust were produced.

On the other hand, when the temperature on the fibrillator head 13 was increased above 700° F., it was found that portions of the tape yarn 18 itself began to melt, yield, disintegrate, distort, or even break.

One important advantage of this heat application process is the dust particles 20 are not only removed from the tape yarns 18, but also no dust collection system is required because of the fusion of the fibrils and debris back into the tape yarn 18. Dust collection systems required in such processes involving air jets, solvents, water streams and mechanical brushing are obviated.

It also has been found that the above process can be applied to a tape yarn of approximately 1.5 mils in thickness, plus or minus 0.5 mils, without minimizing the efficiency of the process or damaging the tape yarn.

What is claimed is:

1. A process for reducing dust particles in a fibrillated tape yarn of synthetic material in which said dust particles are formed in the fibrillation of said tape yarn, comprising the steps of:
    a. relatively moving fibrillated tape yarn of synthetic material past a heating station,
    b. applying a critical amount of heat to said tape yarn at said heating station sufficient to fuse only said dust particles into said tape yarn,
    c. said critical amount of heat being sufficient to melt said dust particles but insufficient to melt or damage said tape yarn.

2. The process according to claim 1 further comprising the step of relatively moving a plurality of said fibrillated tape yarn of synthetic material past said heating station, said tape yarns being substantially in the same plane.

3. The process according to claim 1 further comprising the initial step of fibrillating said tape yarn at said heating station.

4. The process according to claim 3 in which the step of fibrillating said tape yarn comprises fibrillating a tape of synthetic material by moving said tape over a rotary fibrillator head of heat conductive material, said heat-applying step comprising applying said critical amount of heat to said fibrillator head as said tape contacts said head while being fibrillated.

5. The process according to claim 4 in which said tape is approximately 1–2 mils thick and is moved over said fibrillator head in an arc of an optimum length of approximately 3½ inches at an optimum speed of approximately 660 feet per minute, said heat-applying step comprising applying said critical amount of heat to said fibrillator head at a temperature of approximately 600–700° F.

6. The process according to claim 5 in which said fibrillator tape yarn is at least 300 denier.

7. The process according to claim 1 in which the critical amount of heat applied to said tape yarn of synthetic material at said heating station is substantially equivalent to the quantity of heat applied to an instantaneous linear section of said tape yarn approximately 3½ inches long moving at a linear rate of speed of approximately 660 feet per minute at a temperature of approximately 600–700° F.

8. The process according to claim 7 in which said synthetic tape yarn is approximately 1–2 mils thick.

9. The process according to claim 7 in which said fibrillated tape yarn is at least 300 denier.

10. The process according to claim 7 in which said synthetic material is polypropylene.

* * * * *